United States Patent [19]

Kawata

[11] 4,079,802

[45] Mar. 21, 1978

[54] METHODS AND DEVICES FOR CONTROLLING DISTANCE BETWEEN VEHICLES

[75] Inventor: Syoji Kawata, Toyota, Japan

[73] Assignee: Aisin Seiki Company, Limited, Japan

[21] Appl. No.: 755,575

[22] Filed: Dec. 29, 1976

Related U.S. Application Data

[63] Continuation-in-part of Ser. No. 662,241, Feb. 27, 1976, abandoned, which is a continuation of Ser. No. 530,326, Dec. 6, 1974, abandoned, which is a continuation of Ser. No. 305,343, Nov. 10, 1972, abandoned.

[30] Foreign Application Priority Data

Nov. 11, 1971 Japan ............................... 46-90213

[51] Int. Cl.² ........................................... B60T 7/12
[52] U.S. Cl. ................................... 180/98; 303/100; 340/53; 343/7 VM
[58] Field of Search ............ 180/98; 246/187 C; 303/91, 100; 340/52 R, 53, 62; 343/7 VM

[56] References Cited

U.S. PATENT DOCUMENTS

| 2,804,160 | 8/1957 | Rashid | 180/98 |
| 2,851,120 | 9/1958 | Fogiel | 180/98 |
| 3,420,572 | 1/1969 | Bisland | 180/98 X |
| 3,448,822 | 6/1969 | La Lone et al. | 180/98 |
| 3,689,882 | 9/1972 | Dessailly | 340/53 |
| 3,749,197 | 7/1973 | Deutsch | 180/98 |
| 3,898,652 | 8/1975 | Rashid | 343/7 VM X |
| 3,921,749 | 11/1975 | Kawada | 180/98 |

OTHER PUBLICATIONS

Carp, R. W. et al., Adaptive Speed Control for Automobiles, Bendix Technical Journal, Autumn 1969, pp. 46–57.

*Primary Examiner*—Stephen G. Kunin
*Attorney, Agent, or Firm*—Oblon, Fisher, Spivak, McClelland & Maier

[57] ABSTRACT

A method and a device for controlling the separation distance between trailing and leading vehicles in which the trailing vehicle is caused to reduce its velocity when the actual distance between the trailing and leading vehicles is less than an optimum safety distance, and is subjected to a maximum braking force when the actual distance reaches a minimum safety distance.

10 Claims, 4 Drawing Figures

METHODS AND DEVICES FOR CONTROLLING DISTANCE BETWEEN VEHICLES

CROSS-REFERENCE TO RELATED APPLICATIONS

This is a continuation-in-part of application Ser. No. 662,241 filed Feb. 27, 1976, now abandoned which is a continuation of application Ser. No. 530,326 filed Dec. 6, 1974, and now abandoned, which in turn is a continuation of application Ser. No. 305,343 filed Nov. 10, 1972, and also abandoned.

BACKGROUND OF THE INVENTION

1. Field of the Invention

This invention relates to a method and a device for controlling the separation distance between leading and trailing vehicles, and more particularly to a method and a device for automatically controlling and guiding the trailing vehicle along a road surface in some predetermined spaced relation to the leading vehicle.

2. Description of the Prior Art

It is generally desirable to control the distance between two vehicles to achieve the following objectives:

1. Prevention of a rear end collision due to the braking of the leading vehicle.
2. Avoidance of application of excessive braking force.
3. Maintenance of relatively close spacing between leading and trailing vehicles.
4. Smooth braking at the beginning of brake application.

While generally somewhat satisfactory, the prior art methods and devices for controlling the separation distance between leading and trailing vehicles have failed to operate satisfactorily within the above objectives.

SUMMARY OF THE INVENTION

It is, therefore, an object of the present invention to provide an improved method and a device for controlling the separation distance between two vehicles wherein the trailing vehicle is automatically decelerated when the two vehicles approach each other within a predetermined distance, and is automatically accelerated when the distance between the two vehicles is greater than the predetermined distance.

It is a further object of the present invention to provide an improved method and a device for controlling the separation distance between two vehicles wherein the two vehicles may be closely spaced thereby permitting greater utilization of the roadway.

It is a still further object of the present invention to provide an improved method and device for controlling the separation distance between two vehicles wherein the trailing vehicle is subjected to a maximum braking force when the leading vehicle comes within a predetermined distance.

Briefly, in accordance with this invention, the foregoing and other objects are in one aspect attained by the provision of methods and apparatuses for controlling the distance between the two vehicles by not applying the brakes of the trailing vehicle until the two vehicles are within an optimum safe distance apart, but applying the brakes maximumly when they are within a minimum safe distance apart.

BRIEF DESCRIPTION OF THE DRAWINGS

These and further objects and advantages of the present invention will become apparent from the following detailed description when considered in connection with the accompanying drawings in which like reference numerals designate like or corresponding parts throughout the several figures, and wherein.

DETAILED DESCRIPTION OF THE INVENTION

Figure 1:
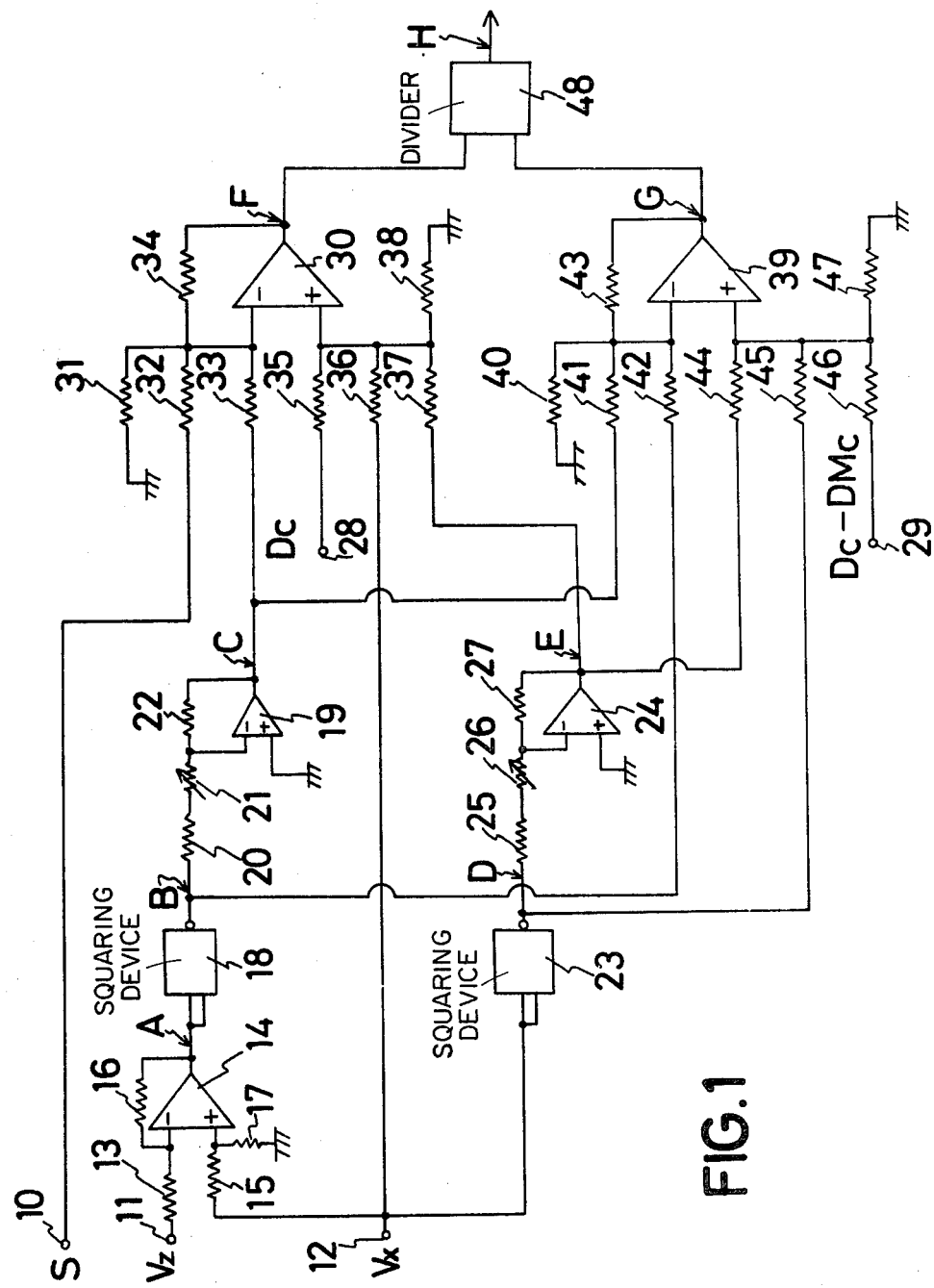
FIGS. 1 and 2 are diagrammatic views showing one preferred embodiment of an electric circuit according to the present invention.

Before entering into the detailed description of one embodiment of the present invention according to the accompanying drawings, the theory of the present invention will be explained in detail hereinafter.

It is well-known that the stopping distance S of a vehicle initially moving with a velocity V and subject to deceleration caused by the force of friction is expressed by the following equation:

$$S = \frac{V^2}{2\mu g} \tag{1}$$

where $\mu$ is the coefficient of friction between tires and a road surface and is a constant, with a value less than about 0.7, for given tires and road surface; $g$ is the acceleration due to gravity. In this equation (1), $\mu g$ may be recognized as the deceleration of the vehicle. Therefore, now assuming that a braking system can be employed in which the vehicle deceleration is also determined by the stepping force on a brake pedal, i.e. the braking force applied to the vehicle in the direction opposite its line of travel, the stopping distance can still be expressed in the form of equation (1) if $\mu$ is replaced by a variable effective coefficient of friction equal to the sum of $\mu$ and the ratio of the (variable) braking force to the weight of the vehicle. If the effective coefficient of friction corresponding to the maximum braking force is $\mu_m$ and that corresponding to the optimum braking force is $\mu_o$, the stopping distance owing to the maximum braking force may be said to be equal to $$\frac{V^2}{2\mu_m g} \tag{2}$$

and the stopping distance owing to the optimum braking force may be said to be equal to $$\frac{V^2}{2 = \mu_o g} \tag{3}$$

When the trailing vehicle is travelling with its initial velocity $V_x$ and the leading vehicle is travelling with its initial velocity $V_y$, the relative velocity $V_z$ between two vehicles may be represented by $(V_x - V_y)$. Now if $V_x \geq V_y$, i.e., $V_z \geq 0$ and each of the trailing and leading vehicles is subjected to the maximum braking force the distance of approach between the trailing and leading vehicles is represented by $$\frac{V_x^2}{2\mu_m g} - \frac{V_y^2}{2\mu_m g} \qquad (4)$$

However, it should be noted that there is the response time delay C until the braking system of the trailing vehicle begins to actuate. Also, for the purpose of preventing a collision, it is required that the two vehicles be separated by a critical distance $DM_c$ when they have stopped. Of course, the critical distance $DM_c$ is larger than 0. Therefore, a minimum separation distance $DM$ must be maintained between the two vehicles represented by the following equation:

$$DM = DM_c + V_x \cdot C + \frac{V_x^2}{2\mu_m g} - \frac{V_y^2}{2\mu_m g} \qquad (5)$$

This distance $DM$ will be defined as the minimum safety distance.

Next, when the leading vehicle is going to stop with a braking force corresponding to an effective coefficient of friction $\mu_y$ and the trailing vehicle with a braking force corresponding to an effective coefficient of friction $\mu_x$, a safety distance D between the two vehicles may be expressed by the following equation:

$$D = D_c + V_x \cdot C + \frac{V_x^2}{2\mu_x g} - \frac{V_y^2}{2\mu_y g} \qquad (6)$$

in which $D_c$ is a critical distance between two vehicles when the trailing vehicle has stopped and is larger than 0 for prevention of collision. In order to prevent a collision the coefficients must be related as follows:

$$\mu_x \leq \mu_y \leq \mu_m \qquad (7)$$

As will be clear from the foregoing, the distance D represented by the above equation (6) must be maintained between the two vehicles in order to stop the trailing vehicle with the braking force corresponding to the effective coefficient of friction $\mu_x$. This distance D will be defined as the optimum safety distance. The braking forces corresponding to effective coefficients of friction $\mu_x$ and $\mu_y$ are selected as the desirable braking forces and, more particularly, assuming that the leading vehicle is stationary, the braking force corresponding to effective coefficient of friction $\mu_x$ is selected as the desirable braking force when the trailing vehicle approaches the stationary leading vehicle.

However, it should be noted that the braking forces corresponding to effective coefficients of friction $\mu_x$ and $\mu_y$ are different from the necessary braking forces which are actually applied to wheels. Namely, the braking forces corresponding to effective coefficients of friction $\mu_x$ and $\mu_y$ should be considered as the braking forces to determine the optimum safety distance. As previously stated, each of the trailing and leading vehicles is assumed to have a maximum braking force and a desirable braking force so that the minimum and optimum safety distances between two vehicles can be calculated. Thus, the present invention contemplates the provision of a device to provide a control effect wherein the brakes of the trailing vehicle will not be actuated until the separation distance between two vehicles will become shorter than the optimum safety distance D and the trailing vehicle will be subjected to the maximum braking force when the separation distance between the two vehicles reaches the minimum safety distance DM. That is, the magnitude of the force applied to the trailing vehicle is set equal to the product of the maximum braking force and the absolute value of a coefficient $A_x$ defined by the following equation:

$$A_x = \frac{S - D}{D - DM} \qquad (8)$$

where S is the actual separation distance between two vehicles. The direction of the force is indicated by the sign of $A_x$. Thus, the equation (8) given above represents that it is necessary to supply a braking force responsive to the amount of $$\left| \frac{S - D}{D - DM} \right| \quad \text{when} \quad \frac{S - D}{D - DM} < 0$$

and to supply an accelerating force responsive to the amount of $$\left| \frac{S - D}{D - DM} \right| \quad \text{when} \quad \frac{S - D}{D - DM} > 0$$

Therefore, the brakes will be actuated when $$S < D \qquad (9)$$

and $$D - DM > 0 \qquad (10)$$

and from the formulae (5), (6), (7) and (10), $$D_c - DM_c > 0 \qquad (11)$$

The maximum braking force will be applied when $S = DM$.

It is generally understood that the running distance of a non-accelerating vehicle may be defined as the value of the vehicle velocity multiplied by time. However, the distance between two vehicles and the running distance per second are extremely different from each other. These distances are detected, respectively, as corresponding electric voltages by sensor means, but if these distances be recorded on the same scale, the variable range of the distance between two vehicles will be much smaller than that of the running distance. In addition, it should be noted that the voltage which varies in proportion to the vehicle velocity is squared in the calculating circuits. Therefore, it is technically difficult to design the calculating circuits, for example the circuit for calculating the ratio of the above equation (8), with a high accuracy. In electric circuits according to the present invention, therefore, the units of the velocity and the units of the distance are respectively converted into the M. U. (Machine Unit) in which the respective maximum values of the velocity and the distance are normalized to 1 M. U. In addition, 10 volts equals 1 M. U. in the squaring device used for the calculating circuit.

Now if the variable range of the effective coefficient of friction $\mu_x$ corresponding to the braking force is selected and the minimum value thereof is $\mu_{x\,min}$ and if the possible maximum velocity is $V_{max}$, the acceptable maximum value of the distance between two vehicles may be expressed by the following equation:

$$S_{max} = D_c + V_{max} \cdot C + \frac{V_{max}^2}{2\mu_{x\,min}g} \quad (12)$$

If $D$ will be expressed by the MU unit, $$D(MU) = \frac{D}{S_{max}} \quad (13)$$

Likewise, $$DM(MU) = \frac{DM}{S_{max}} \quad (14)$$

$$D_c(MU) = \frac{Dc}{S_{max}} \quad (15)$$

$$DM_c(MU) = \frac{DM_c}{S_{max}} \quad (16)$$

$$S(MU) = \frac{S}{S_{max}} \quad (17)$$

$$V_x(MU) = \frac{V_x}{V_{max}} \quad (18)$$

$$V_y(MU) = \frac{V_y}{V_{max}} \quad (19)$$

Therefore, $$D = S_{max} D(MU) \quad (20)$$

$$DM = S_{max} DM(MU) \quad (21)$$

$$D_c = S_{max} D_c(MU) \quad (22)$$

$$DM_c = S_{max} DM_c(MU) \quad (23)$$

$$S = S_{max} S(MU) \quad (24)$$

$$V_x = V_{max} V_x(MU) \quad (25)$$

$$V_y = V_{max} V_y(MU) \quad (26)$$

Substituting the formulae (20) to (26) for the formula (6), $$S_{max}D(MU) = S_{max}D_c(MU) + V_{max} \cdot V_x(MU) \cdot C + \frac{V_{max}^2 V_x^2(MU)}{2g\,\mu_x} - \frac{V_{max}^2 V_y^2(MU)}{2g\,\mu_y}$$

Therefore;

$$D(MU) = D_c(MU) + \frac{V_{max}}{S_{max}} \cdot C \cdot V_x(MU) + \frac{V_{max}^2}{2gS_{max}} \cdot \frac{V_x^2(MU)}{\mu_x} - \frac{V_{max}^2}{2gS_{max}} \cdot \frac{V_y^2(MU)}{\mu_y} \quad (27)$$

If $$\frac{V_{max}}{S_{max}} = K_1 \quad (28)$$

and $\frac{V_{max}^2}{2gS_{max}} = K_2 \quad (29)$ the equation (27) may be expressed as follows:

$$D(MU) = D_c(MU) + K_1 \cdot C \cdot V_x(MU) + \frac{K_2}{\mu_x} \cdot V_x^2(MU) - \frac{K_2}{\mu_y} V_y^2(MU) \quad (30)$$

Likewise, substituting the formulae (20) to (26) and the formulae (28) and (29) for the formula (5), it may be expressed as follows:

$$DM(MU) = DM_c(MU) + K_1 \cdot C \cdot V_x(MU) + \frac{K_2}{\mu_m} \cdot V_x^2(MU) - \frac{K_2}{\mu_m} V_y^2(MU) \quad (31)$$

The equation (8) converted in the $MU$ unit is as follows:

$$A_x(MU) = \frac{S(MU) - D(MU)}{D(MU) - DM(MU)} \quad (32)$$

Therefore, substituting the equations (30) and (31) for the equation (32)

$$A_x(MU) = \frac{S(MU) - D_c(MU) - K_1 \cdot C \cdot V_x(MU)}{D_c(MU) - DM_c + \frac{K_2}{\mu_x} V_x^2(MU)}$$

$$\frac{- \frac{K_2}{\mu_x} V_x^2(MU) + \frac{K_2}{\mu_y} V_y^2(MU)}{- \frac{K_2}{\mu_m} V_x^2(MU) - \frac{K}{\mu_y} V_y^2(MU) + \frac{K_2}{\mu_m} V_y^2(MU)} \quad (33)$$

Instructive signals according to the present invention will be delivered and controlled depending on the calculation and its result of the equation (33) so that the operations of the accelerator and the brake pedal can be controlled.

Referring now to the drawings, a control system of the present invention embodied in connection with the above theory will be described hereinafter. The control system applied to the trailing vehicle includes conventional sensor means, not shown, such as a radar with the use of micro-waves, adapted for respectively detecting an actual distance S ($MU$) between two vehicles, a relative velocity $V_z(MU)$ between two vehicles and a velocity $V_x$ ($MU$) of the trailing vehicle as corresponding proportionate electric voltages respectively. These voltages are applied, respectively, to terminals 10, 11 and 12. The terminal 11 is electrically connected through a resistor 13 to an inverting input terminal of a first operational amplifier 14. The terminal 12 is electrically connected to a non-inverting input terminal of the amplifier 14 through a resistor 15. The inverting input terminal of the amplifier 14 is electrically connected to an output terminal thereof through a resistor 16. The non-inverting input terminal of the amplifier 14 is grounded through a resistor 17. Thus, the voltage at point A according to the output characteristics of the first amplifier 14 will be proportional to $$V_x(MU) \frac{R17}{R15} - V_z(MU) \frac{R16}{R13}$$

where $R13$, $R15$, $R16$ and $R17$ represent, respectively resistance values of the resistors 13, 15, 16 and 17. (Resistance values of the resistors will be similarly defined hereinafter.)

If it is assumed that $R13 = R16$ and $R15 = R17$, then the voltage at point A will be proportional to $$V_x(MU) - V_z(MU)$$

Therefore, the voltage at point A corresponds to the velocity $V_y(MU)$ of the leading vehicle.

The numeral 18 denotes a first squaring device which acts to square and invert the voltage from the amplifier 14, and thus the output voltage of the squaring device 18 at point B will be proportional to $-V_y^2(MU)$.

An inverting input terminal of a second operational amplifier 19 is electrically connected to the output of the squaring device 18 through a resistor 20 and a variable resistor 21 while the output terminal of the second amplifier 19 is connected through a resistor 22 to the inverting input terminal thereof. A non-inverting input terminal of the second amplifier 19 is grounded. Accordingly, the output voltage of the second amplifier 19 at point C will be proportional to $$-(-V_y^2)\frac{R22}{R20+R21}(MU)$$

If R20, R21 and R22 are chosen so that R20, R21 and R22 and $K_2$ and $\mu_y$ mentioned above according to the theory of the present invention obey the following relation:

$$\frac{R22}{R20+R21}=\frac{K_2}{\mu_y}$$

the voltage at point C will be proportional to $$\frac{K_2}{\mu_y}V_y^2(MU)$$

where the value of $\mu_y$ may be adjusted by modifying the resistance value of the variable resistor 21, so that the stopping distance of the leading vehicle depending on the braking force corresponding to the effective coefficient of friction $\mu_y$ which is selected by the resistance value of the resistor 21 can be calculated. If the value of $\mu_y$ is increased, the optimum safety distance between two vehicles will become larger. A second squaring device 23 which functions in the same manner as the first squaring device 18 is electrically connected to the terminal 12. Therefore, the output voltage of the second squaring device 23 at point D will be proportional to $$-V_x^2(MU)$$

A third operational amplifier 24 has an inverting input terminal electrically connected to the output of the second squaring device 23 through a resistor 25 and a variable resistor 26 while a non-inverting input terminal is grounded. The output terminal of the third amplifier 24 is electrically connected to the non-inverting input terminal thereof through a resistor 27. Thus the output voltage of the third amplifier 24 at point E will be proportional to $$-(-V_x^2)\frac{R27}{R25+R26}(MU$$

Now assuming that $$\frac{R27}{R25+R26}=\frac{K_2}{\mu_x}$$

the voltage at point E will be proportional to $$\frac{K_2}{\mu_x}\cdot V_x^2(MU)$$

The variable resistor 26 acts so as to adjust the value of braking force $\mu_x$ by modifying the resistance value thereof so that the stopping distance of the trailing vehicle depending on the braking force corresponding to the effective coefficient of friction $\mu_x$ which is selected by the resistance value of the resistor 26 can be calculated. If the value of $\mu_x$ is increased, the optimum safety distance will become shorter. As will be clear from abovementioned, the optimum safety distance can be adjusted by modifying the resistance values of the variable resistors 21 and 26. A constant voltage proportional to $D_c(MU)$ is applied to a terminal 28 and a constant voltage proportional to $D_c(MU) - DM_c(MU)$ is applied to a terminal 29 in which $D_c$ and and $DM_c$ represent the critical distances defined already in relation to the theory of the present invention. A fourth operational amplifier 30 serves as a summing amplifier. An inverting input terminal of the fourth amplifier 30 is grounded through a resistor 31 and is connected, respectively, to the terminal 10 and the output terminal of the second amplifier 19 through a resistor 32 and a resistor 33. The output terminal of the fourth amplifier 30 is connected to the inverting input terminal thereof through a resistor 34. A non-inverting input terminal of the fourth amplifier 30 is connected, respectively, to the terminal 28, the terminal 12 and the output of the third amplifier 24 through resistors 35, 36 and 37, respectively. The resistance value of the resistor 36 is set according to the response time delay of the trailing vehicle braking system. The non-inverting input terminal of the fourth amplifier 30 is grounded through a resistor 38. Thus the output voltage of the fourth amplifier 30 at point F will be proportional to $$-\frac{R34}{R31}\cdot O(MU)-\frac{R34}{R32}\cdot S(MU)-\frac{R34}{R33}\cdot\frac{K_2}{\mu_y}V_y^2$$
$$(MU)+\frac{R38}{R35}D_c(MU)+\frac{R38}{R36}V_x(MU)+\frac{R38}{R37}\frac{K_2}{\mu_x}V_x^2(MU)$$

Now if R32 = R33 = R34 = R35 = R37 = R38, and R31 = R36 = R38/$K_1c$ the voltage at point F will be proportional to:

$$-[S(MU)-D_c(MU)-K_1CV_x(MU)-\frac{K_2}{\mu_x}V_x^2(MU)+$$
$$\frac{K_2}{\mu_x}V_y^2(MU)]$$

A fifth amplifier 39 also serves as a summing amplifier and includes an inverting input terminal which is grounded through a resistor 40. The output voltages of the second amplifier 19 and the first squaring device 18 are respectively applied to the inverting input terminal of the fifth amplifier 39 through resistors 41 and 42. An output terminal of the fifth amplifier 39 is connected to the inverting input terminal thereof through a resistor 43. The fifth amplifier 39 has a non-inverting input terminal to which is respectively applied the output voltage of the third amplifier 24 through a resistor 44, the output voltage of the second squaring device 23 through a resistor 45 and the voltage of the terminal 29 through a resistor 46. The non-inverting input terminal of the fifth amplifier 39 is grounded through a resistor 47. Thus, the output voltage of the fifth amplifier 39 at point G will be proportional to $$-\frac{R43}{R40} O(MU) - \frac{R43}{R41} \frac{K_2}{\mu_y} V_y^2(MU) -$$

$$\frac{R43}{R42}(-V_y^2)(MU) + \frac{R47}{R44} \cdot \frac{K_2}{\mu_x} V_x^2(MU) + \frac{R47}{R45}$$

$$(-V_x^2)(MU) + \frac{R47}{R46}[D_c(MU) - DM_c(MU)]$$

If R40 = R41 = R43 = R44 = R46 = R47, R42 = $\mu_m/K_2$ R43 and R45 = $\mu_m/K_2$ R47 the voltage at point G will then be proportional to $$D_c(MU) - DM_c(MU) + \frac{K_2}{\mu_x} V_x^2(MU) - \frac{K_2}{\mu_m} V_x^2$$

$$(MU) - \frac{K_2}{\mu_y} V_y^2(MU) + \frac{K_2}{\mu_m} V_y^2(MU)$$

Namely, the resistance values of the resistors 42 and 45 will be chosen according to the maximum braking forces applied to the leading and trailing vehicles whereby the stopping distances of the leading and trailing vehicle subjected to the maximum braking force can be calculated, respectively. The numeral 48 denotes a divider in which the voltage at point F is divided by the voltage at point G and the output voltage of the divider 48 is inverted with respect to its input. Therefore, the output voltage of the divider 48 at point H will be proportional to $$\frac{S(MU) - D_c(MU) - K_1 C V_x(MU) - \frac{K_2}{\mu_x} V_x^2(MU)}{D_c(MU) - DM_c(MU) + \frac{K_2}{\mu_x} V_x^2(MU) - \frac{K_2}{\mu_m} V_x^2(MU)}$$

$$\frac{+ \frac{K_2}{\mu_y} V_y^2(MU)}{- \frac{K_2}{\mu_y} V_y^2(MU) + \frac{K_2}{\mu_m} V_y^2(MU)} = A_x(MU)$$

In this equation, it is necessary to apply the braking force when $A_x < 0$ and it is necessary to apply the accelerating force when $A_x > 0$.

Figure 2:
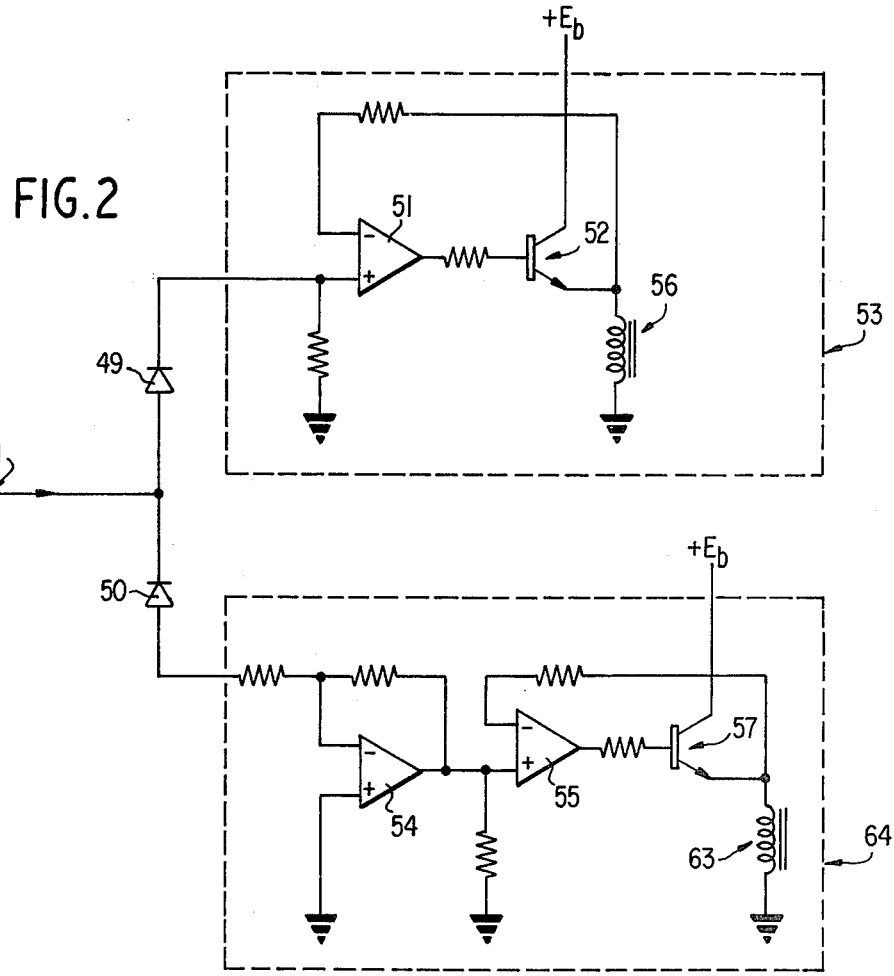

In FIG. 2, numerals 49 and 50 denote respectively diodes wherein an anode terminal of the diode 49 and a cathode terminal of the diode 50 are connected, respectively, to the output of the divider 48. Accordingly, when the voltage at point H is positive, that is, when it is necessary to accelerate the trailing vehicle, the diode 49 will be conductive while the diode 50 will be non-conductive. On the other hand, when the voltage at point H is negative, that is, when it is necessary to apply the brakes of the trailing vehicle, the diode 49 will be non-conductive while the diode 50 will be conductive. A sixth operational amplifier 51, a PNP-type transistor 52, and a solenoid 56 are arranged as shown in FIG. 2 to form a first emitter-follower booster circuit 53. The emitter-follower booster circuit 53 is connected to the cathode terminal of the diode 49, as shown in FIG. 2. A voltage $+E_b(V)$ is applied to the collector terminal of the transistor 52.

A seventh operational amplifier 54, an eighth operational amplifier 55 an NPN-type transistor 57, and a solenoid 63 are arranged as shown in FIG. 2 to form a second emitter-follower booster circuit 64. The second emitter-follower booster circuit 64 is connected to the anode terminal of the diode 50, as shown in FIG. 2. A voltage $+E_b(V)$ is applied to the collector terminal of the transistor 57.

Figure 3:
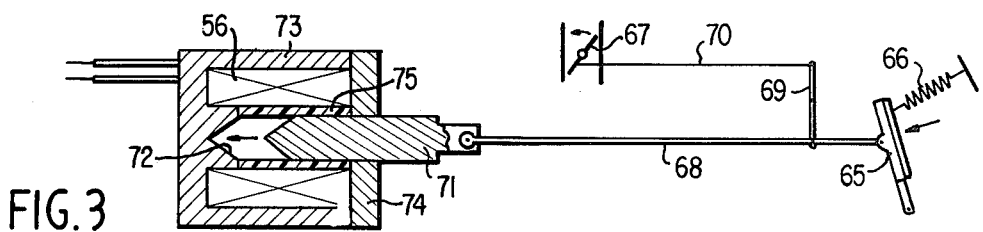
FIG. 3 is a diagrammatic view, with parts in a cross-sectional view, illustrating a vehicle accelerating means associated with the electric circuits shown in FIGS. 1 and 2.

Referring now to FIG. 3, an accelerator pedal 65 biased by a return spring 66 in a clockwise direction is mechanically connected to a throttle valve 67 through connecting rods 68, 69 and 70. Therefore, when the accelerator pedal 65 is depressed so as to rotate in a counter clockwise direction, the throttle valve 67 is urged in its direction of opening to accelerate the vehicle. The rod 68 is connected at other end thereof to a first plunger 71 made of magnetic material. The plunger 71 is slidably mounted within a bore 72 formed in housings 73 and 74 made of magnetic materials which, in turn, house the solenoid 56 of the first emitter-follower booster circuit 57 therein. Disposed between the solenoid 56 and the plunger 71 is a non-magnetic material 75. Now assuming that the diode 49 is conductive, the first emitter-follower booster will be actuated. Therefore, the transistor 55 will turn on allowing the solenoid 56 to be energized. Thus, the voltage at point H will cause a current proportional thereto to flow through the solenoid 56. Accordingly, the plunger 71 will be drawn to the left in proportion to the current flow through the solenoid 56 and the throttle valve 67 will be urged in its direction of opening by an amount proportional to the voltage amount at point H. If the maximum acceleration is 0.2 g, the throttle valve 67 is arranged so as to be urged in the full throttle condition when the voltage at point H reaches 0.2 (MU).

Figure 4:
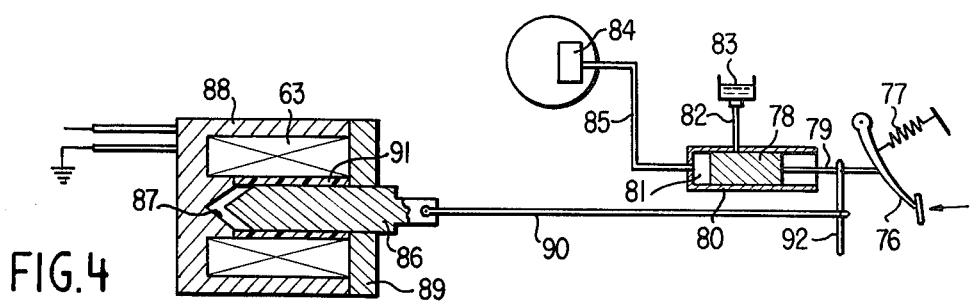
FIG. 4 is a diagrammatic view, with parts in a cross-sectional view, providing a brake control means associated with the electric circuits shown in FIGS. 1 and 2.

In FIG. 4, a brake pedal 76 biased by a return spring 77 in a counterclockwise direction is mechanically connected to a piston 78 through a rod 79. The piston 78 is slidably mounted within a housing 80 so as to control fluid communication between a chamber 81 and a passage 82 connected to a reservoir 83. The chamber 81 is fluidically connected to wheel cylinder means 84 via a conduit 85. A second plunger 86 made of magnetic material is slidably mounted within a bore 87 formed in housings 88 and 89 made of magnetic materials which, in turn, house the solenoid 63 of the second emitter-follower booster circuit 64 therein. The plunger 86 is mechanically connected to the rod 79 through connecting rods 90 and 92. Disposed between the solenoid 63 and the plunger 86 is a non-magnetic material 91. Assuming the diode 50 to be conductive, the second emitter-follower booster circuit 64 is actuated and the output of the seventh amplifier 58 is inverted with respect to its input. Therefore, the transistor 62 will be turned on energizing the solenoid 63. A current proportional to the voltage at point H will flow through the solenoid 63 causing the plunger 86 to move to the left in FIG. 4. Thus the piston 78 will be actuated proportionally to the voltage at point H and in turn will actuate the wheel cylinder means. The wheel cylinder control system according to the present invention is arranged and designed so as to be actuated with a maximum deceleration 0.7 g when the voltage at point H reaches −0.7(MU).

Various other modifications and variations of the present invention are obviously possible in light of the above teachings. It is to be understood, therefore, that within the scope of the appended claims, the invention may be practiced otherwise than as specifically described herein.

What is claimed as new and desired to be secured by Letters Patent of the United States is:

1. A method for controlling a distance between trailing and leading vehicles comprising the steps of:
    (a) detecting the velocity of the trailing vehicle;
    (b) detecting the relative velocity of the trailing and leading vehicles;
    (c) calculating a minimum safety distance between said two vehicles depending on said respective detected velocities under the assumption that maximum braking forces are applied, respectively, to said two vehicles;
    (d) calculating an optimum safety distance between said two vehicles depending on said respective detected velocities under the assumption that selective and desirable braking forces are applied, respectively, to said two vehicles;
    (e) detecting the actual separation distance between said two vehicles;
    (f) calculating the difference between said actual distance and said optimum safety distance;
    (g) calculating the difference between said optimum and minimum safety distances;
    (h) dividing said difference between said actual distance and said optimum safety distance by said difference between said optimum and minimum safety distances and generating an instruction signal responsive thereto; and
    (i) accelerating the vehicle velocity of said trailing vehicle when said signal is larger than zero and reducing the vehicle velocity of said trailing vehicle when said signal is less than zero.

2. The method as claimed in claim 1 wherein step (i) includes the step of:
    accelerating the vehicle velocity of said trailing vehicle when said signal is larger than zero and in proportion to said signal and reducing the vehicle velocity of said trailing vehicle when said signal is less than zero and in proportion to said signal.

3. A device for a trailing vehicle for controlling the separation distance between trailing and leading vehicles comprising:
    a first terminal for applying an electric voltage proportional to the actual separation distance between the two vehicles;
    a second terminal for applying an electric voltage proportional to the relative velocity of the two vehicles;
    a third terminal for applying an electric voltage proportional to the velocity of said trailing vehicle;
    first circuit means coupled to said second and third terminals for providing an output signal dependent on the velocity of said leading vehicle;
    second circuit means connected to said first circuit means for calculating the stopping distance of said leading vehicle depending on said leading vehicle velocity on the assumption that a predetermined braking force is applied to said leading vehicle;
    third circuit means connected to said third terminal for calculating the stopping distance of said trailing vehicle depending on said trailing vehicle velocity on the assumption that a predetermined braking force is applied to said trailing vehicle;
    fourth circuit means connected to said first circuit means for calculating the stopping distance of said leading vehicle depending on said leading vehicle velocity on the assumption that a predetermined maximum braking force is applied to said leading vehicle;
    fifth circuit means connected to said third terminal for calculating the stopping distance of said trailing vehicle depending on said trailing vehicle velocity on the assumption that a predetermined maximum braking force is applied to said trailing vehicle;
    sixth circuit means connected, respectively, to said first and third terminals and said second and third circuit means for calculating an optimum safety distance between said two vehicles and generating an output signal proportional to the difference between said actual separation distance between said two vehicles and said optimum safety distance;
    seventh circuit means connected, respectively, to said second, third, fourth and fifth circuit means for calculating a minimum safety distance between said two vehicles and generating an output signal proportional to the difference between said optimum safety distance and said minimum safety distance;
    a divider for dividing the output signal of said sixth circuit means by the output signal of said seventh circuit means and generating an output signal responsive thereto;
    eighth circuit means connected to said divider for generating a first output signal to accelerate said trailing vehicle velocity when the output signal of said divider is larger than zero and a second output signal to reduce said trailing vehicle velocity when the output signal of said divider is less than zero; and,
    actuating means for receiving the first and second output signals of said eighth circuit to thereby accelerate or reduce said trailing vehicle velocity.

4. The device as set forth in claim 3 further including a first squaring device connected to said first circuit means, the output signal of said first squaring device being applied to said second and fourth circuit means and a second squaring device connected to said third terminal, the output signal of said second squaring device being applied to said third and fifth circuit means.

5. The device as set forth in claim 4, wherein said second circuit includes a first variable resistor, said predetermined braking force applied to said leading vehicle being varied by modifying the resistance value of said first variable resistor and said third circuit means includes a second variable resistor, said predetermined braking force applied to said trailing vehicle being varied by modifying the resistance value of said second variable resistor.

6. The device as set forth in claim 5 wherein said resistance value of said first variable resistor is larger than and equal to said resistance value of said second variable resistor.

7. The device as set forth in claim 4, wherein said fourth circuit means includes a resistor for selecting said predetermined maximum braking force applied to said leading vehicle and said fifth circuit means includes a resistor for selecting said predetermined maximum braking force applied to said trailing vehicle.

8. The device as set forth in claim 3 including a fourth terminal for applying an electrical voltage proportional to a first critical distance, said fourth terminal being connected to said sixth circuit means and a fifth terminal connected to said seventh circuit means for applying an electrical voltage proportional to a second critical distance.

9. The device as set forth in claim 8 wherein said first critical distance is longer than said second critical distance.

10. The device as set forth in claim 3, wherein said eighth circuit means includes a pair of solenoids selectively energized in response to the output signal of said divider and said actuating means includes means operatively connected to one of said solenoids and responsive to current flow therethrough for accelerating said trailing vehicle and means operatively connected to the other of said solenoids and responsive to current flow therethrough for reducing the velocity of said trailing vehicle.

* * * * *